US009390045B2

(12) United States Patent
Rohwer et al.

(10) Patent No.: US 9,390,045 B2
(45) Date of Patent: Jul. 12, 2016

(54) BUS NODE AND CONTROL SYSTEM FOR CONTROLLING A WORK MACHINE

(75) Inventors: Rolf Rohwer, Ostfildern (DE); Andreas Alois Siedler, Ludwigsburg (DE); Jürgen Eckert, Esslingen (DE)

(73) Assignee: FESTO AG & CO. KG, Esslinger (DE)

( * ) Notice: Subject to any disclaimer, the term of this patent is extended or adjusted under 35 U.S.C. 154(b) by 347 days.

(21) Appl. No.: 14/006,364

(22) PCT Filed: Jan. 21, 2012

(86) PCT No.: PCT/EP2012/000272
§ 371 (c)(1),
(2), (4) Date: Nov. 18, 2013

(87) PCT Pub. No.: WO2012/126545
PCT Pub. Date: Sep. 27, 2012

(65) Prior Publication Data
US 2014/0075077 A1 Mar. 13, 2014

(30) Foreign Application Priority Data
Mar. 23, 2011 (DE) .......................... 10 2011 014 883

(51) Int. Cl.
*G06T 13/00* (2011.01)
*G06F 13/40* (2006.01)
*H04L 12/40* (2006.01)
(52) U.S. Cl.
CPC .......... *G06F 13/40* (2013.01); *H04L 12/40032* (2013.01); *H04L 2012/40221* (2013.01)
(58) Field of Classification Search
CPC .............. G06F 13/40; H04L 12/40032; H04L 2012/40221

USPC ............................. 361/679.32; 710/302–305
See application file for complete search history.

(56) References Cited

U.S. PATENT DOCUMENTS

| 5,822,195 | A | * | 10/1998 | Brench | ................ | H05K 9/0039 |
| | | | | | | 174/354 |
| 6,008,985 | A | * | 12/1999 | Lake | .................. | G05B 19/0423 |
| | | | | | | 361/679.32 |
| 8,332,567 | B2 | * | 12/2012 | Burr | ..................... | G05B 19/042 |
| | | | | | | 710/25 |

FOREIGN PATENT DOCUMENTS

| DE | 10316129 | 10/2004 |
| DE | 102006030706 | 1/2008 |
| DE | 102009033691 | 12/2010 |
| EP | 0419713 | 4/1991 |
| WO | WO2009118028 | 10/2009 |

* cited by examiner

*Primary Examiner* — Tammara Peyton
(74) *Attorney, Agent, or Firm* — Hoffmann & Baron, LLP

(57) ABSTRACT

A bus node for an electric coupling of a bus system to a functional module arrangement, having an electronic circuit for converting electrical signals between a bus protocol provided by the bus system and an internal communications protocol provided by the functional module arrangement, and having a first coupling means for electrically connecting the electronic circuit to the functional module arrangement, and having a second coupling means for electrically connecting the electronic circuit to the bus system, wherein the first coupling means comprises a first contact means that is configured for a direct electrical contact with a ground connection of the functional module arrangement.

15 Claims, 2 Drawing Sheets

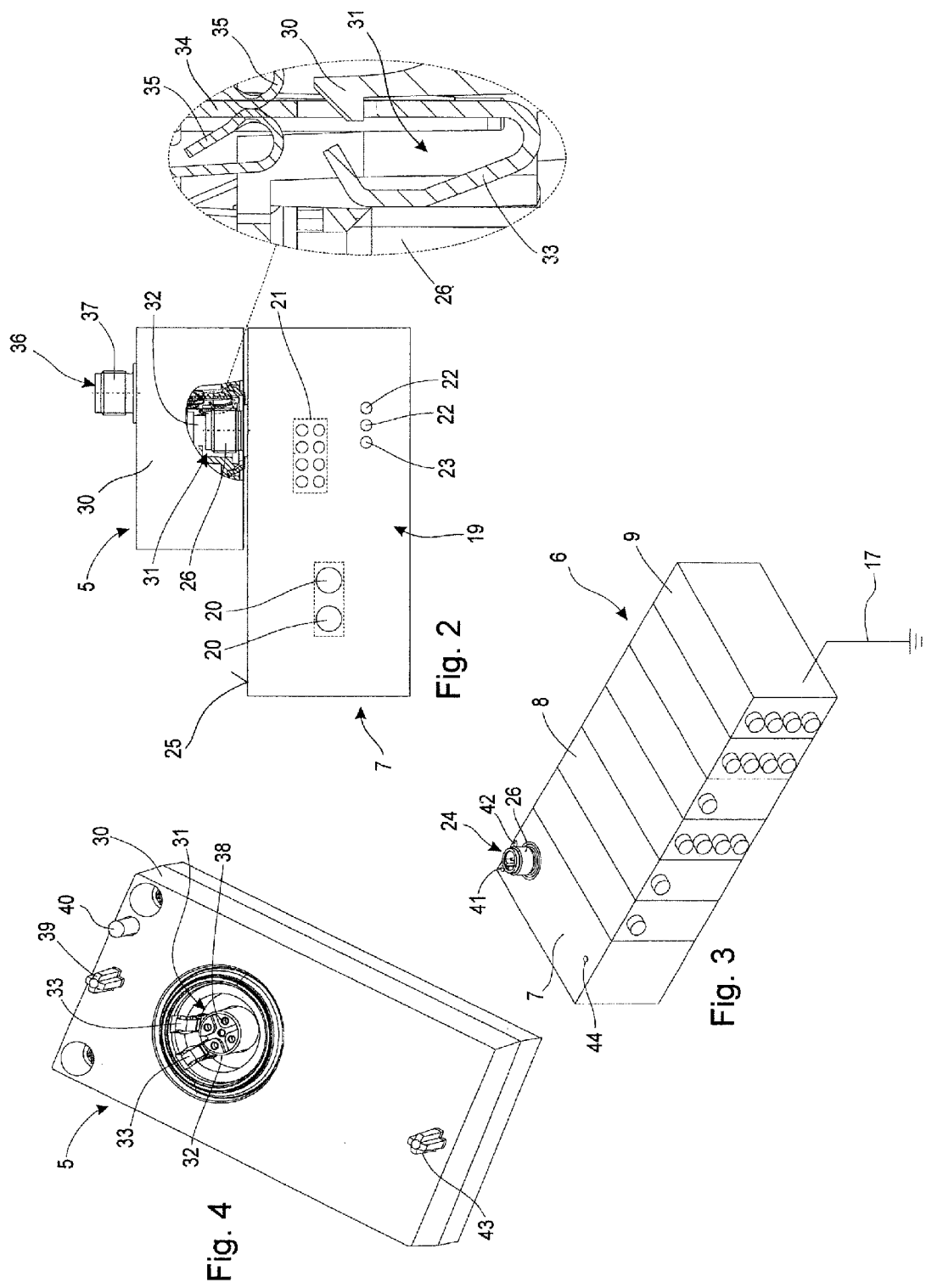

BUS NODE AND CONTROL SYSTEM FOR CONTROLLING A WORK MACHINE

This application claims priority based on an International Application filed under the Patent Cooperation Treaty, PCT/EP2012/000272, filed Jan. 21, 2012, which claims priority to DE102011014883.3, filed Mar. 23, 2011.

BACKGROUND OF THE INVENTION

The invention relates to a bus node for an electric coupling of a bus system with a functional module arrangement, having at electronic circuit for converting electrical signals between a bus protocol provided by the bus system and an internal communications protocol provided by the functional module arrangement, and having a first coupling means for electrically connecting the electronic circuit to the functional module arrangement, and having a second coupling means for electrically connecting the electronic circuit to the bus system. Furthermore, the invention relates to a control system for controlling a work machine.

DE 10 2006 030 706 A1 discloses a system and a method for controlling bus-networked devices by means of a gateway via an open field bus. The disclosure specifies aspects of data technology networking, the user configuration of the devices, as well as the electrical power supply to the devices. Indicated as typical devices are industrial switching devices, such as contactors, engine starters, circuit breakers and measuring sensors, as well as similar devices, wherein the system includes at least one gateway that is switched between an open field bus and the actuators.

DE 102009033691 B3 discloses a device for transmitting data between a serial data bus and work modules, wherein the data bus is connected to a bus node in a bus module that includes at least two serial communications connections that are linked to ports of a hub, which is connected to the bus node or integrated therein, wherein the communications connections are configured for connecting the work modules and for providing them with a voltage supply, and wherein at least one of the work modules is configured as an actor and/or E/A module that contains a serial-parallel converter for the parallel connection of actors and/or a serial-parallel converter for the parallel connection of E/A interfaces, which are included in the respective work module or connected thereto, wherein the serial connections between the hub and the work modules are configured as point-to-point connections.

SUMMARY OF THE INVENTION

It is the object of the present invention to provide a bus node and a control system for controlling a work machine that feature better properties regarding the output of interference signals and/or the input of interference signals.

This object is achieved according to a first aspect of the invention for a bus node of the kind as set forth in the introduction having the characteristics of Claim 1. It is provided therein that the first coupling means comprises a first contact means that is configured for a direct electrical contact with a ground connection of the functional module arrangement.

Typically, the ground potential for the bus node is provided by means of a bus cable that is available for connecting the bus system to a control module, or by means of individual ground connection points on the respective housings. Due to the fact that the bus cable can have a considerable length, depending on the spatial arrangement of the bus node and the control module, it is subject to mechanical loads particularly in processing machines, for example due to vibrations, and the ground potential that is provided by means of the bus cable at the bus nodes can deviate from a ground potential on the functional module arrangement. Moreover, external influences can be the cause for the ground potential that is applied at the control module, and which is provided via the bus cable to the bus node, to deviate from the ground potential on the functional module arrangement. To improve the output and/or input of interference signals for the bus node, the invention provides for bringing the bus node in direct electrical contact with a ground connection of the functional module arrangement, particularly by means of the first coupling means that is configured for the electrical connection to the functional module arrangement and that comprises a first contact means. It is thereby ensured that the ground potential that is applied on the bus node is equal to the ground potential of the functional module arrangement, whereby the unidirectional or bidirectional signal transmission between the bus node and the functional module arrangement results in a reduced interference signal output and increased resistance to incoming interference signals.

Advantageous improvements of the invention are the subject-matter of the dependent claims.

Expediently, the second coupling means comprises a second contact means that is configured for providing a ground potential, which can be applied to the first contact means of the functional apparatus, to the bus system. This way, it is possible to provide the ground potential of the functional module arrangement to the bus cable as well in order to achieve the desired reduction of the output of interference signals and increase of the resistance to incoming interference signals for the bus node.

It is advantageous for the contact means to be configured as a spring-elastic contact blade for a plug connection with a ground potential, particularly with the ground connection of the functional module arrangement. This allows for achieving a simple coupling between the bus node and the functional module arrangement and/or the bus cable. The coupling is preferably achieved byway of a plug-in connection, which is why the contact means are configured, correspondingly, as connectors on the functional module arrangement and on the bus node.

An improvement of the invention provides that the contact means comprises a plurality of circumferentially disposed contact blades to ensure a shielding effect between the ground connection and the electronic circuit or the ground connection, the electronic circuit and the second coupling means. This way, it is possible to achieve a further reduction of the output of interference signals and/or an increase of the resistance to incoming interference signals for the bus node.

Preferably, the contact means is configured for a plug connection with a collet of a screw connector, particularly of an M8 or an M12 connector. This way, the bus node can be easily connected to a functional module arrangement, particularly by means of a plug-connection step. With this coupling the of bus node and screw connector of the functional module arrangement, the signal lines are connected, which are needed for the transmission of the signal according to the internal communications protocol, and the ground connection is created.

According to a second aspect of the invention, the object is achieved by means of a control system for controlling a work machine according to claim 5. The control system comprises a control module for the output of control commands to a bus system, a bus system for routing the control commands, a bus node for converting control commands according to a bus protocol into control commands according to an internal communications protocol of a functional module arrangement, as well as a functional module arrangement that comprises valve modules for controlling fluidic actors and/or electrical switching modules for controlling electrical actors and/or input-output modules for controlling and/or monitoring sensors, which can be influenced, respectively, by the control commands provided by the internal communications protocol, wherein the functional module arrangement can be coupled to a ground potential, particularly a machine stand, and it comprises a contact means for a signal-transmitting coupling between the functional module arrangement and the bus node, which includes a ground connection that is connected to the ground potential, and wherein the bus node is configured with the capacity of being coupled to the functional module arrangement, and a first contact means of the bus node is connected directly to the contact means in such a manner that an electrical contact between the ground connection of the functional module arrangement and the bus node is ensured.

The control module can be, for example, a memory-programmable control that is configured for providing control commands to components of the work machine. To this end, a communication must be provided with actors and/or sensors that are disposed on the work machine and that implement the control commands of the control system and/or allow for feedback of the effects of the control commands on the control system. The work machine can be, for example, a processing machine for work pieces, aligned with actors that can be fluidically and/or electrically powered, as well as associated sensors. The bus system allows for the transmission of the control commands between the control module and the functional module arrangement according to a preset bus protocol, for example according to a profibus protocol. The bus node is provided for converting the control commands that are contained in the bus protocol into an internal communications protocol of the functional module arrangement and providing them to the same. The functional module arrangement comprises a plurality of functional modules that are set up in such a manner that, based on the provided control commands, they undertake, for example a fluidic or electrical controlling of actors and/or a selection of sensors, routing possibly detected sensor signals via the internal communications protocol to the bus node. For an advantageous functioning of the functional module arrangement as well as for compliance with the pertinent regulations, it is envisioned herein that the functional module arrangement is connected to a ground potential, for example a machine frame of the work machine. According to the invention, this ground potential is to be provided at the bus node as well. This way, the electrical and/or electronic circuits in the functional module apparatus and in the bus node are applied to the same ground potential, thereby achieving a minimal level of interference signal output from the bus node and a high level of resistance to incoming interference signals of the bus node.

In an advantageous improvement of the invention, it is provided that the bus node is configured with the capacity of being plugged onto the functional module arrangement.

This way, it is possible to implement a mechanical and electrical coupling between the bus node and the functional module arrangement that is particularly easy to handle.

Expediently, the ground connection on the functional module arrangement is configured as a screw connector, particularly as a collet of an M8 plug connector or an M12 plug connector. Such screw connectors are configured, for example, for a mechanically high resistant connection with a cable having a corresponding plug. An electrical connection between the signal lines of a screw connector and a collet is achieved by a plug connector, the ground potential is provided by the collet and a corresponding screwed ring. Frequently, M8 plug connectors or M12 plug connectors are used for the connection of the bus system. Preferably, a recess is provided in the bus node that is adjusted relative to the external geometry of the collet, such that the bus node can be plugged onto the surface of the functional module arrangement in such a manner that it is aligned flush as much as possible, wherein the collet is almost completely received by the recess.

Preferably, it is provided that the first contact means is configured as a spring-elastic contact blade, particularly as a group of circumferentially disposed contact blades. This allows for achieving the desired ground connection between the functional module arrangement and the bus node, when plugging the bus node onto the functional module arrangement, without any need for the user to engage in further action. Preferably, the at least one contact blade is configured such that it rests against an outer side of the ground connection, which is configured, in particular, as a collet.

A further embodiment of the invention provides that the valve and/or switching and/or input and/or output modules of the functional module arrangement are disposed as lined up, adjacently and in series in relation to each other, and that they are coupled to one another in said serial alignment by electrical and/or fluidic means. This way, it is possible to achieve a compact arrangement of the functional modules. Furthermore, any supply of the individual functional modules with electrical energy, with one or a plurality of fluids, particularly compressed air, and with the signals according to an internal communications protocol is facilitated.

Expediently, the functional module arrangement comprises a connection module that is configured as an electrical connection element between the functional modules and the bus node. The connection module serves for providing a central service of supply energy, of fluid and control signals to the functional modules that are disposed downstream, and, to this end, it comprises the corresponding connection means, such as at least one supply voltage connection and at least one fluid connection, as well as a plug connector, particularly an M8 plug connector or an M12 plug connector that are configured for providing signals to the internal communications protocol for the functional module arrangement.

An advantageous embodiment of the invention is represented in the drawings. Shown are as follows:

BRIEF DESCRIPTION OF THE DRAWINGS

FIG. 2 is a representation of a partial sectional side view of a functional module arrangement with placed bus node;

FIG. 3 is a representation of a perspective view of a functional module arrangement; and FIG. 4 is a representation of a perspective view of an interface area of a bus node.

DETAILED DESCRIPTION OF THE PREFERRED EMBODIMENTS

Figure 1:
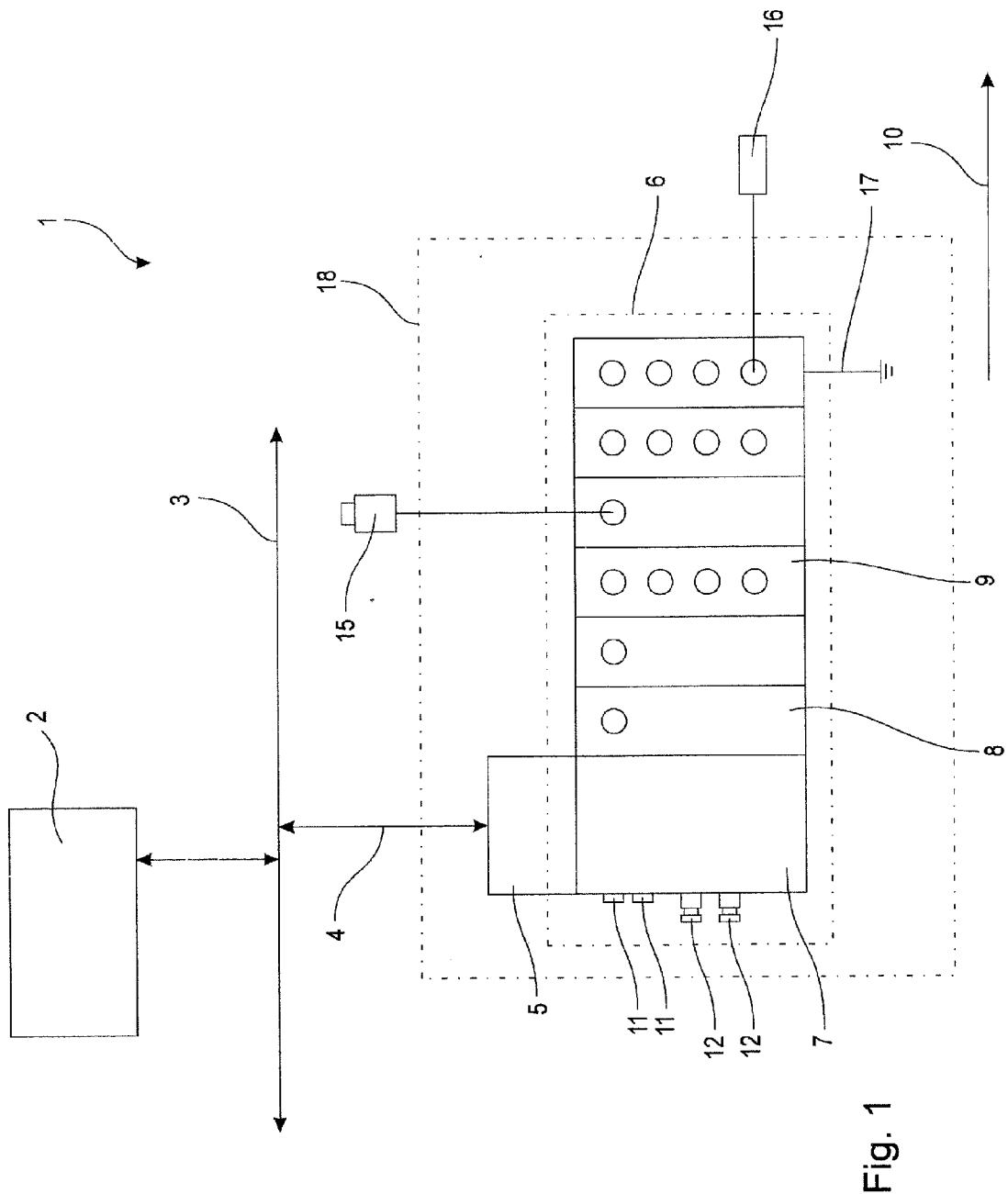
FIG. 1 is a control system for a processing machine for the purpose of controlling electrical and/or fluidic actors.

FIG. 1 shows a schematic view of a control system 1 for a processing machine, which is not shown in further detail. The control system 1 comprises, in an exemplary manner, a control module 2 for the output of control commands to a bus system 3. The bus system 5 can be a field bus system that is commonly used for such processing machines, by way of an example with a bus protocol according to the profibus protocol. The bus system 3 is connected via a bus line, which is configured, for example, as a bus cable 4, to a bus node 5. The bus node 5, in turn, is electrically connected to a functional module arrangement 6 comprising a plurality of functional modules 7, 8 and 9. A first functional module therein is configured as a connection module 7, a second one as a valve module 8, and a third as an input/output module 9. The functional modules 7, 8 and 9 are disposed in a longitudinal alignment, serially along a line-up axis 10, respectively having the mounting surfaces 11 oriented toward each other, and in a sealing fashion, including fluid channels, supply lines and signal lines extending along the line-up axis 10, which are not shown in further detail. The supply lines are connected to supply connections 11 that are configured on the connection module 7 and that allow for providing an electrical voltage, for example a low AC voltage, to the remaining functional modules 8 and 9. The fluid channels are connected to the fluid connections 12, which are configured on the connection module 7. By way of an example, a first fluid connection 12 is configured as a compressed air connection, and a second fluid connection 12 is configured as an exhaust air connection 12.

The signal lines, which are also not shown and that extend along the line-up axis 10 though the functional modules, allow for a signal transmission between the bus node 5 and the functional modules 8 and 9. This way, it is possible, according to an internal communications protocol, for control commands from the control module 2 that were provided to the bus node 5 via the bus system 3, particularly via the bus cable 4, to be routed to the functional modules 8 and 9. By means of such control commands, it is possible, for example, to control a valve module 8 to provide fluid to a connected fluidic actor 15. A control command that is provided according to the internal communications protocol to an input/output module 9, can cause, by way of an example, a readout of a measured value from a connected sensor 16. Preferably, the input/output module 9 routes the read sensor signal, according to the internal communications protocol, to the bus node 5, and in the bus node 5 said signal is converted into the bus protocol and from there made available to the control module 2 for further processing.

To achieve reliable electrical function, the functional module arrangement 6 includes a ground connection 17 that is connected to a ground potential, for example a grounded metallic machine stand, which is not shown in further detail. Advantageously, the bus node 5 is also applied to this ground potential by the electrical contact as described in further detail below and depicted in FIGS. 2 and 4, as symbolically represented by the potential limit 18.

FIG. 2 depicts the bus node 5 and the connection module in further detail. The connection module 7 includes at a mounting surface 19, disposed parallel relative to the alignment of the plane of representation in FIG. 2, two fluid channels 20, a plurality of signal lines 21, two supply lines 22 and a ground line 23. The electrical lines 21, 22, 23 include, respectively, raised contact pins that protrude from the mounting surface 19, which are provided to be received inside the corresponding contact bushings of a functional module 8 or 9 that can be serially lined up with the mounting surface. The signal lines 22 and the ground line 23 are terminated in the connection module 7 on a screw connector 24, as shown in FIG. 3. The screw connector 24 is disposed, by way of an example, on a connecting surface 25, having a normal alignment relative to the mounting surface 19 in FIG. 2 and comprising a collet 26, that is not shown by way of a sectional representation for a better understanding of the drawing. Inside the collet 26, which is electrically connected to the ground line 23, a plurality of contact pins and/or receptacles, which are not depicted in further detail, are connected to the signal line 21 by way of an example.

Presently, in the representation according to FIG. 2, the bus node 5 is placed directly on the screw connector 24 that is shown in FIG. 3. A recess 31 is provided inside a housing 30 of the bus node 5 that is embodied as larger than a spatial extension of the screw connector 24 as depicted in FIG. 3, thereby allowing the screw connector 24 to plunge completely into the housing 30. A circuit board, which is not shown in further detail, is provided on the bus node 5, and arranged thereupon is an electronic circuit of the bus node 5, also not shown in further detail, and disposed thereon is a plug pin 32 made of an insulating material, as shown in FIG. 4, and which accommodates five electrically conducting receptacles 38 therein. The receptacles 38 are electrically connected to the circuit board, and they are connected to the signal lines 21 directly or, according to FIG. 2, via an electrically intermediately switched electronic circuit that is disposed on the circuit board, not shown here. Furthermore, according to the representation in FIG. 2, a contact spring 33 is housed inside a recess 31 in a wall section, serving as first contact means for electrically coupling the circuit board in the bus node 5 to the collet 26 of the screw connector 24, that is shown in further detail in FIG. 3. The contact spring 33 and the plug pin 32 constitute the coupling means for the connection between the bus node 5 and the functional module arrangement 6.

By way of an example, the contact spring 33, which is preferably embodied in one piece, is configured, at an end that is directed away from the mouth of the recess 31, as flat connector contact 34. Said flat connector contact 34 is housed between two contact springs 35 that are electrically connected to the circuit board, particularly soldered to the circuit board, such that the ground potential of the functional module arrangement 6 that can be provided at the collet 26 of the screw connector 24 can be routed to the bus node 5. Based on the exemplary configuration of the contact spring 33 which has been selected essentially as a U-shaped metal spring made of flat band material, a reliable electrical contact is achieved between the bus node 5 and the screw connector 24 of the functional module arrangement 6, and wherein the bus node 5 must only be plugged onto the screw connector 24 of the functional module arrangement 6. In an embodiment that is presently not shown, the contact spring is connected directly to the circuit board, particularly by crimping and/or soldering, or it is in electrical touch contact with the circuit board.

On a surface of the bus node 5 that is directed away from the functional module arrangement 6, a further screw connector 36 is disposed that is provided for connecting the bus cable 4, wherein the bus cable can additionally take over the electrical supply of the bus node 5 and, if need be, that of the functional module arrangement 6. According to the embodiment as shown in FIGS. 2 to 4, the ground potential that is applied to the contact spring 33, tapped off by the collet 26, is looped through to the collet 37 of the screw connection 36.

FIG. 3 demonstrates a schematic view of the functional module arrangement 6. The screw connector 24 is mounted to a top side of the connection module 7.

FIG. 4 depicts the recess 31 that is formed in the housing 30 of the bus node 5. By way of an example, the recess 31 accommodates the contact pin 32 with the exemplary five receptacles 38, as well as two contact springs 33 that are disposed adjacently relative to each other. Next to the recess 31, a centering pin 39 is formed in one piece with the housing 30, and a rotatably supported screw 40 is disposed thereon as well, which are provided for a receptacle in a correspondingly configured recess 41 and/or a thread bore 42 in the connection module 7, serving to establish a correct and reliable coupling between the bus node 5 and the connection module 7. For this purpose, it is also possible to provide a centering pin 43 that is formed in one piece with the bus node 5 and a recess 44 that is configured in the connection module 7.

The invention claimed is:

1. A bus node for an electric coupling of a bus system to a functional module arrangement, having an electronic circuit for converting electrical signals between a bus protocol provided by the bus system and an internal communications protocol provided by the functional module arrangement, which comprises valve modules for controlling fluidic actors and/or electrical switching modules for controlling electrical actors and/or input-output modules for controlling and/or monitoring sensors, and having a first coupling means for electrically connecting the electronic circuit to the functional module arrangement, and having a second coupling means for electrically connecting the electronic circuit to the bus system, wherein the first coupling means comprises a first contact means that is configured for a direct electrical contact with a ground connection of the functional module arrangement for providing a ground potential of the functional module arrangement to the bus node.

2. The bus node according to claim 1, wherein the second coupling means comprises a second contact means that is configured for providing the ground potential of the functional module arrangement, which can be applied to the first contact means, to the bus system.

3. The bus node according to claim 1, wherein the contact means is configured as a spring-elastic contact blade for a plug connection with a ground connection.

4. The bus node according to claim 1, wherein the contact means comprises a plurality of circumferentially disposed contact blades to ensure a shielding effect between the ground potential and the electronic circuit.

5. The bus node according to claim 1, wherein the contact means is configured for a plug connection with a collet of a screw connector.

6. A control system for a work machine comprising a control module for the output of control commands to a bus system, a bus system for routing the control commands, a bus node for converting control commands according to a bus protocol into control commands according to an internal communications protocol of a functional module arrangement, as well as having a functional module arrangement comprising valve modules for controlling fluidic actors and/ or electrical switching modules for controlling electrical actors and/or input-output modules for controlling and/or monitoring sensors, that can be influenced, respectively, by the control commands provided by the internal communications protocol, wherein the functional module arrangement can be coupled to a ground potential and comprises a contact means for a signal-transmitting coupling between the functional module arrangement and the bus node, and the contact means includes a ground connection that is connected to the ground potential, and wherein the bus node is configured such that it can be coupled to the functional module arrangement, and a first contact means of the bus node is connected directly to the contact means such that an electrical contact between the ground connection of the functional module arrangement and the bus node is ensured.

7. The control system according to claim 6, wherein the bus node is configured such that it can be plugged onto the functional module arrangement.

8. The control system according to claim 6, wherein the ground connection is configured as a collet of a screw connector on the functional module arrangement.

9. The control system according to claim 6, wherein the contact means is configured as a spring-elastic contact blade.

10. The control system according to claim 6, wherein the valve and/or switching and/or input/output modules of the functional module arrangement are lined up against each other in a line-up direction and electrically and/or fluidically coupled to each other in the line-up direction.

11. The control system according to claim 10, wherein the functional module arrangement comprises a connection module that is configured as an electrical connecting element between the functional modules and the bus node.

12. The bus node according to claim 1, wherein the contact means is configured as a spring-elastic contact blade for a plug connection with a ground connection of the functional module arrangement.

13. A bus node for an electric coupling of a bus system to a functional module arrangement, having an electronic circuit for converting electrical signals between a bus protocol provided by the bus system and an internal communications protocol provided by the functional module arrangement, and having a first coupling means for electrically connecting the electronic circuit to the functional module arrangement, and having a second coupling means for electrically connecting the electronic circuit to the bus system, wherein the first coupling means comprises a first contact means that is configured for a direct electrical contact with a ground connection of the functional module arrangement, wherein the contact means is configured for a plug connection with an M8 connector or an M12 connector.

14. The control system according to claim 6, wherein the ground connection is configured as a collet of an M8 connector or an M12 connector.

15. The control system according to claim 6, wherein the contact means is configured as a group of circumferentially disposed contact blades.

* * * * *